Eagle & Smith,
Button.
No. 57,101. Patented Aug. 14, 1866.
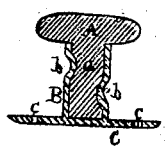
Witnesses:
John A. Wiedersheim
W. F. Hall
R. N. Eagle
C. D. Smith
By Munroe
Attorneys

UNITED STATES PATENT OFFICE.

R. N. EAGLE AND C. D. SMITH, OF WASHINGTON, DISTRICT OF COLUMBIA.

IMPROVEMENT IN BUTTONS.

Specification forming part of Letters Patent No. 57,101, dated August 14, 1866.

*To all whom it may concern:*

Be it known that we, R. N. EAGLE and C. D. SMITH, both of Washington, in the county of Washington and District of Columbia, have invented a new and useful Improvement in Buttons and Studs; and we do hereby declare the following to be a full, clear, and exact description of the nature, construction, and operation of the same sufficient to enable others skilled in the art to which it appertains to fully understand and use the same, reference being had to the accompanying drawing, which is made a part of this specification, and which represents a central longitudinal section of a button having a rubber head and a shank of harder material, the same being illustrative of our said invention.

This improvement provides a button or stud which can be used in connection with a metal-bound, rigid, or ordinary button-hole; and it consists, chiefly, in making the button or its head of rubber or analogous elastic material, which shall contract to permit the button-hole to pass over and around it, and then resume its normal expanded state to secure the button-hole in its locked or fastened condition.

The annexed drawing represents an elastic head and a novel means of attaching the same to a metallic shank and disk, the latter affording the medium for permanently attaching the button to the garment or article upon which it is to be used, or constituting one member of a stud with an elastic head, which may be used in connection with two or more button-holes, one or more of which may be non-elastic. A is the head, and B the shank, and C the disk.

The head is made of soft rubber or analogous elastic material, and may be formed in one piece with the projecting stem $a$, which passes into the tubular shank B. The stem $a$, after insertion, may be securely retained within the shank by indenting the latter, as seen at $b\ b$. These indentations are made at as many points as may be necessary to effect the object; but instead of the indentations, circumferential depressions may be made in the shank, or the shank may be flattened to a sufficient extent to prevent the withdrawal of the rubber by any tension to which it is liable under ordinary usage.

$c\ c$ represent holes in the disk, for sewing or otherwise attaching it to the garment or other article upon which it is to be used. The shank may be of any length, and a stud made after our invention may have two elastic heads, if preferred.

We have shown and described a practical way of making a button—or "stud," as it is denominated in some of its forms—having the characteristics already named—that is to say, which is adapted for contraction to permit a rigid or other button-hole to pass over and around its head, and then expand to retain the button-hole till it is disengaged with the fingers.

The button may, without departing from our invention, be made entirely of soft rubber or other elastic material, and without a shank of any kind; or it may be riveted or otherwise attached to a shank and disk combined, as described, to a shank without the disk, or to a disk without the shank.

The shank may be made of any material and constructed in various ways. Hence, we shall not attempt to anticipate all the various modifications under which the invention may be carried into effect, for the first clause of the claims which follow sets forth the principal feature of the invention with sufficient clearness.

Having thus described our invention, the following is what we claim as new and desire to secure by Letters Patent:

1. A button or button-head made of soft rubber or analogous elastic material, substantially as described.

2. A button or stud having one or more elastic heads and a shank of different or harder material.

3. A rubber head attached to a metallic tubular shank by means of a stem, $a$, which is held within said tubular shank, substantially as described.

4. The combination of an elastic head, A, metal shank B, and disk C, substantially as and for the purpose herein set forth.

R. N. EAGLE.
C. D. SMITH.

Witnesses:
CHARLES A. PETTIT,
GUY C. HUMPHRIES.